Figure 1:
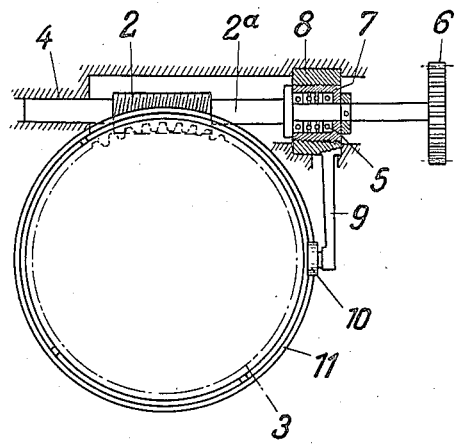

Patented Nov. 2, 1937

2,098,132

UNITED STATES PATENT OFFICE 2,098,132

MECHANISM FOR PRODUCING ACCURATELY PITCHED CUTTING ON CIRCULAR WORK

Erich Büchholz, Berlin, Germany, assignor to Herbert Lindner, Berlin-Wittenau, Germany Application December 16, 1935, Serial No. 54,780
In Germany January 18, 1935

1 Claim. (Cl. 90—1)

The invention relates to mechanism for producing accurately pitched cutting on circular work pieces in which a worm gear acting as a lead or pitch screw is utilized, and more particularly to machine tools comprising a rotary cutting or grinding tool using the hobbing method.

In machines of this character the pitch accuracy of the worm wheel effecting the rotation of the table on which the work is mounted is of special importance as affecting the accuracy of the pitch of the work piece. Considerable difficulty is always encountered in producing a pitch or lead wheel of this kind having teeth of sufficiently accurate pitch as even long and careful finishing cannot eradicate all the remaining defects and for this reason perfectly pitched cutting of the work piece cannot be obtained. After the pitch device has been in use for some time these defects increase and the device no longer possesses the required degree of accuracy.

The invention has for its object wholly to eliminate the effect of the pitch defects or inaccuracies finally present in the pitch wheel or to reduce them to a tolerable value and for this purpose utilizes the known basic principle, employed for compensating for defects in screw threads, of giving compensating auxiliary displacements to the standard gear member derived from a curved guide constructed in accordance with the inaccuracies in pitch of this gear member. In the present case an auxiliary rotation is imparted to the pitch or lead wheel and according to the invention this is effected by axial displacement of the driving worm.

The compensating or correcting device which is displaced through suitable transmission mechanism by the curved guide as the pitch or lead wheel rotates acts in an axial direction upon a pitch curved supporting member for the lead worm or a member provided with this pitch curve in such a manner that the one is rotated relative to the other.

The said supporting member comprises the longitudinal bearing of the worm and is held against the pitch curve, under the action of a spring, for example. For the purpose in view the pitch curve may be a screw thread and the supporting member is then located in a bushing provided with an external screw thread which engages in an internal screw thread in the hub of a lever or the like, this hub being mounted in the casing in such a manner that it is rotatable but axially stationary, the lever cooperating with the curved guide.

This guide is of circular form in order to eliminate special driving mechanism, and is mounted on the rotary table carrying the work piece. If, after a long period of use, the pitch inaccuracies of the worm wheel increase, the curved guide can easily be subsequently reformed. The invention is comparatively simple and inexpensive from the constructional point of view and can also be applied to existing devices or machines, such as rotary cutting or grinding machine tools and the like, so as to enable these to fulfill the most exacting conditions of accuracy.

Figure 2:
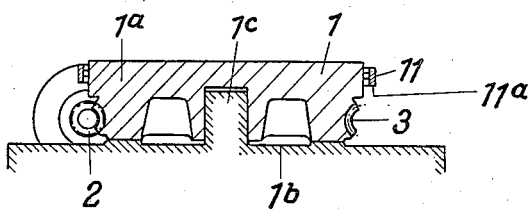
Figure 3:
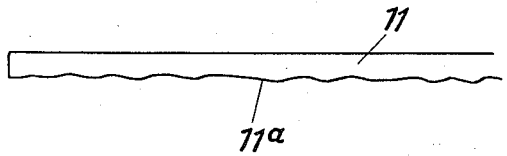

The invention is illustrated by way of example in the accompanying drawing of which Figure 1 is a diagrammatic plan partly sectional of the rotating work table of a machine tool embodying one form of the invention, Figure 2 being a cross-sectional view of Figure 1. Figure 3 is a developed view of the curved guide.

Referring now to the drawing, the work piece (not shown) is mounted on the rotary table 1 of the machine tool and is arranged to be machined by a rotating cutter or grinding wheel, for example. In order to effect the rotary movement of the work piece, the table plate 1a, which is rotatable on the base 1b about a pivot pin 1c, is set into rotation by worm gearing 2, 3. The worm wheel 3 is either integral with the rotary plate 1a or is mounted as a rim on the plate. The driving worm 2 is carried by a shaft 2a, which is rotatably mounted at 4, 5 in the worm casing and is driven by a gear wheel 6, the rotation of which is derived from the rotary movement of the tool, through intermediate gear wheels, for example. The point of support 4 is located directly in the worm casing in the construction illustrated, while the point of support 5 is in a bushing 7 which is provided on its outer circumference with a screw thread of high accuracy engaging with the corresponding internal screw thread of a bushing 8. The bushing 8 is mounted in the casing so as to be rotatable but it is prevented from axial movement and is provided with a lever arm 9, the end of which carries a roller 10 adapted to engage with a circular guide 11 secured to the rotary table. In order to ensure continuous engagement of the roller with the guide 11, the lever 9 is subject to the action of a spring (not shown). The surface 11a of the guide 11 which engages with the roller 10 is formed as a curve, the contour of which corresponds to the pitch inaccuracies present in the worm wheel 3.

In operation it will be understood that as the table 1 (1a) is rotated, the lever 9 undergoes displacements under the action of the curved surface 11a so that the bushing 8 is rotated in one or the other direction. In this manner the bushing 7 of the driving worm 2 is by means of the screw thread given an axial displacement corresponding to the pitch inaccuracy of the worm wheel 3 at the corresponding point. In forming the contour of the guide, both the length of the lever arm 9 and the pitch of the thread on the bushing 7 must be taken into consideration.

I claim:—

In a device for circumferentially operating upon a work piece, a rotatable table for supporting said work piece, a worm wheel carried by said table, a worm meshing with said worm wheel, a shaft carrying said worm, bearings supporting said shaft for revoluble and longitudinal movement of said shaft, and means carried by said table for longitudinally shifting said shaft in accordance with variations in the pitch of said worm wheel, said means being arranged to correct inaccuracies of the pitch of the worm wheel, said last means including a cam on said work piece support and extending continuously therearound, journal means for supporting said shaft, means on said shaft for establishing definite longitudinal positional relation between said shaft and said journal means comprising a screw on said shaft and a nut fixed against longitudinal movement and mounted on said screw, and means to vary the longitudinal displacement of the shaft with respect to variations in the pitch of the teeth on the worm wheel, including an arm fixed to said nut and engaging said cam.

ERICH BÜCHHOLZ.